No. 675,168. Patented May 28, 1901.
H. ROSENBLUM.
MACHINE FOR BRANDING CIGARS.
(Application filed Aug. 15, 1900.)
(No Model.) 2 Sheets—Sheet 1.
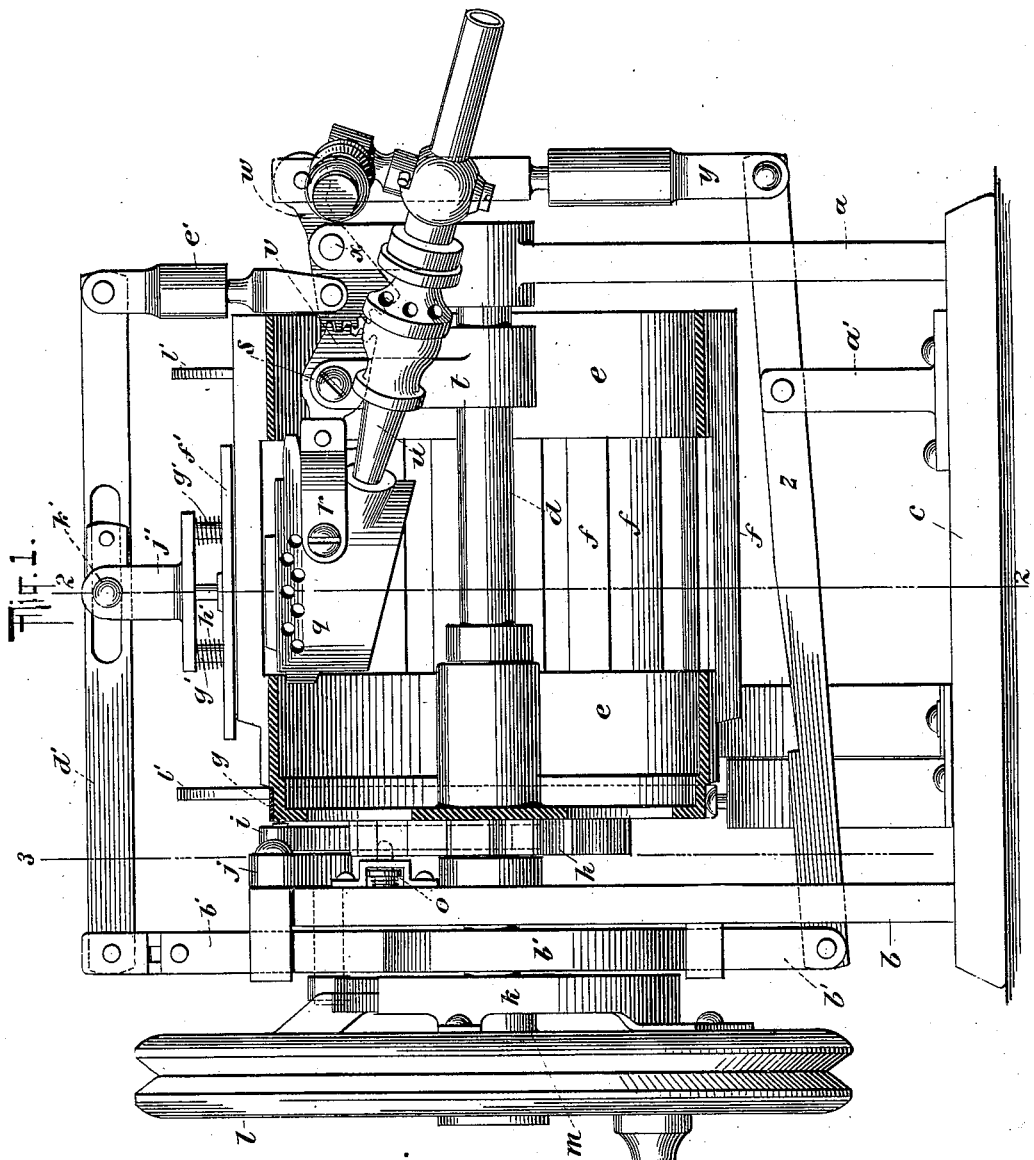

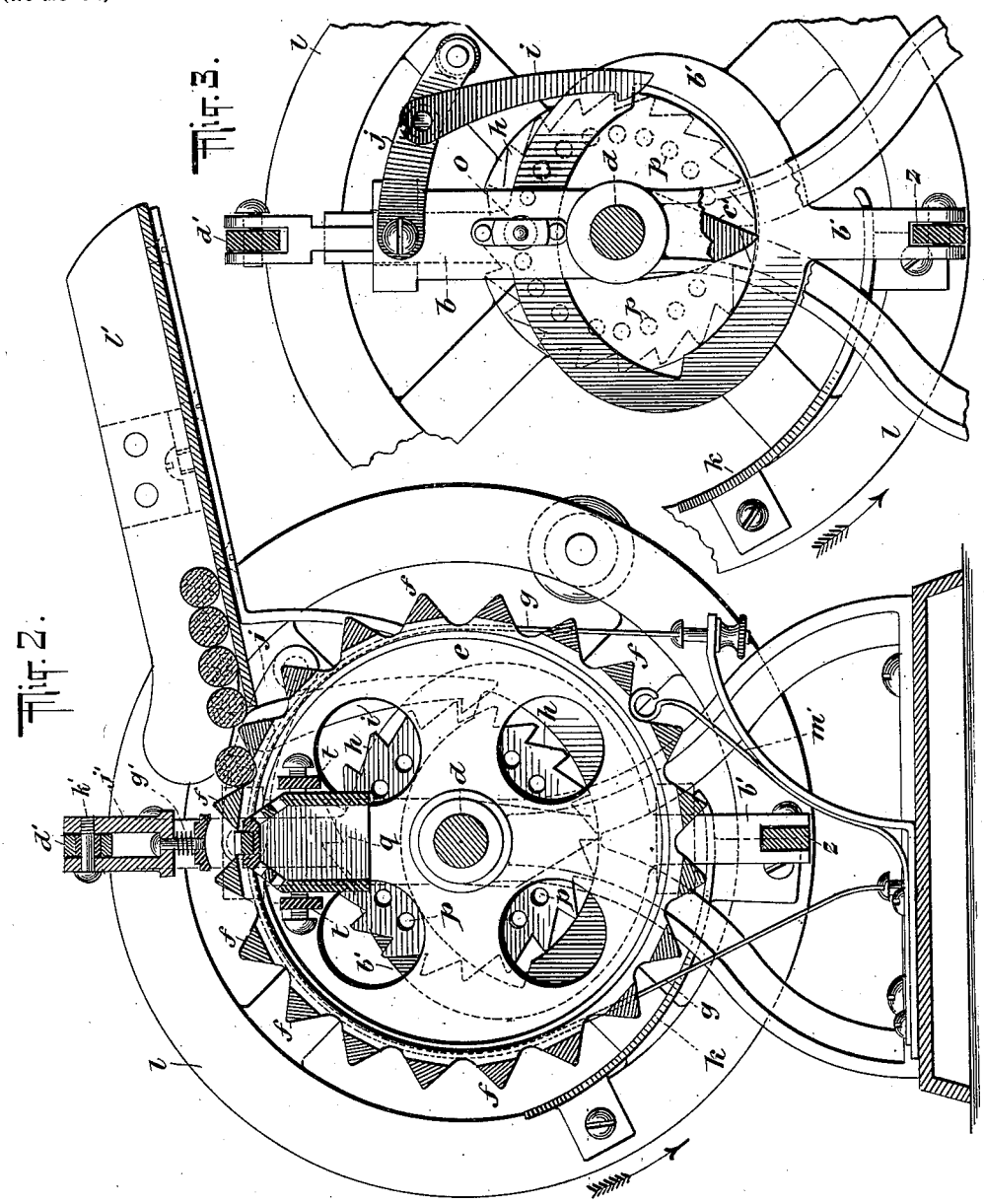

UNITED STATES PATENT OFFICE.

HERMAN ROSENBLUM, OF NEW YORK, N. Y.

MACHINE FOR BRANDING CIGARS.

SPECIFICATION forming part of Letters Patent No. 675,168, dated May 28, 1901.

Application filed August 15, 1900. Serial No. 26,912. (No model.)

*To all whom it may concern:*

Be it known that I, HERMAN ROSENBLUM, a citizen of the United States, residing in the borough of Manhattan, city, county, and State of New York, have invented certain new and useful Improvements in Machines for Branding Cigars, of which the following is a specification.

My invention relates to machines for branding cigars, and has for its object to produce an efficiently-acting machine which will brand cigars without breaking, crushing, or distorting them.

My invention will be fully described in this specification with the aid of the accompanying drawings and the salient features thereof pointed out in the claims at the end of this specification.

In the drawings, Figure 1 is a side elevation, partly in section, of a machine in which my invention is embodied. Fig. 2 is a section on line 2 2 of Fig. 1. Fig. 3 is a broken-away sectional view taken on the line 3 3 of Fig. 1. Fig. 4 is a plan view of the branding device; and Fig. 5 is a sectional view on a large scale, showing the branding device in operation.

In the drawings two standards or uprights $a$ $b$ rise from the bed-plate $c$. These uprights constitute the frame of the machine and serve to support most of the working parts. Mounted in these uprights and extending across the machine is a rod $d$. This rod $d$ serves as the pivotal axis of a squirrel-cage drum $e$, having the bars $f$, which are preferably triangular. The inclined faces of the bars form, with the slots between them, seats for the reception of cigars upon the outside of the drum. The squirrel-cage drum rotates freely upon the rod $d$ and is preferably provided with a suitable brake, shown in the present instance as a band-brake $g$. The squirrel-cage drum receives its rotation as follows: A ratchet $h$ is secured rigidly thereto and coöperates with a pawl $i$. This pawl $i$ is pivoted to an arm $j$, which is pivoted at one end to the upright $b$ and carries a roller at its free end, which roller is struck by a cam $k$, (see Fig. 3,) carried by a driving-wheel $l$, which is fast upon the sleeve $m$, which rotates freely upon the rod $d$. It will be understood that as the wheel $l$ rotates the cam $k$ will oscillate the arm $j$ and cause the drum to be moved around step by step, the drum being locked in each step-by-step position by a spring-bolt $o$, which coöperates with apertures or recesses $p$ in the ratchet $h$. Located within the drum is a suitable branding-stamp, shown in the present instance as a chase $q$, heated by a gas-flame and carried by a yoke $r$, pivoted at $s$ upon a bracket $t$ on the rod $d$. A gas-burner $u$ is carried by the branding-stamp and is suitably connected to its source of gas-supply.

The branding-stamp is caused to rise and fall in the following manner: The arm or yoke $r$ is provided at its rear with a toothed segment $v$, which meshes with another pivoted toothed segment $w$, pivoted at $x$ upon the upright $a$. The free end of the pivoted segment $w$ is pivotally connected to a link $y$, which is pivotally connected to a lever $z$, which is pivoted upon the bracket $a'$ and is pivotally connected to a yoke $b'$, as most clearly shown in Fig. 3 of the drawings, which yoke is operated upon by the arm $c'$, carried upon the same sleeve which carries the wheel $l$. The yoke $b'$ is pivoted at its upper end to an arm $d'$, which in turn is pivoted to a link $e'$, pivoted at its lower end to the pivoted toothed segment $w$. The arm $c'$ rotating within the yoke $b'$ serves to raise and lower the yoke, and thereby raise and lower the links $e'$ and $y$, thereby swinging the branding-stamp on its pivot $s$. The lever $d'$ carries adjustably and pivotally a follower consisting of a follower-plate $f'$, which is spring-pressed by springs $g'$, surrounding guiding-rods $h'$, the whole being carried upon an arm $j'$, pivoted at $k'$ in a slot in the lever $d'$. The follower-plate not only yields springily, but swings on its pivot, thereby enabling it to accommodate itself freely to the shape and size of the cigar. It will be further obvious from the construction that when the branding-stamp rises the follower-plate descends. A suitable hopper $l'$ may be employed as a feeding means to conduct the cigars to the squirrel-cage drum, and a suitable spring-lock $m'$ is likewise preferably provided to maintain the drum in its various step-by-step positions.

The detailed operation of the device is as follows: When the driving-wheel $l$, which may be either hand or power operated, is rotated in the direction of the arrow, the squirrel-cage drum will be revolved step by step, and at the appropriate moment the follower-plate will descend and the branding device rise, so that the branding device will project into the slots between the bars and operate on the cigar held between the bars of the squirrel-cage drum and the follower-plate, the follower-plate serving to permit the branding device to act upon the cigar without injuring it.

The use of my invention is not limited to cigar-branding, but machines embodying my invention may be used for other purposes, such as marking tobacco or paper cigarettes.

Having described my invention, what I claim, and desire to secure by Letters Patent, is—

1. In a cigar-branding machine, the combination of a rotating drum having bars and seats for receiving cigars to be branded, a follower, a pivoted cigar-branding device located within the drum, means for moving the cigar-branding device, and a hopper located above and in proximity to the drum to bring cigars thereto.

2. In a cigar-branding machine, the combination of a rotating slotted drum having recesses for receiving cigars, a spring-actuated pivoted follower-plate in operative relation with the drum and means for branding a cigar.

3. In a cigar-branding machine, the combination of a slotted drum, a cigar-branding device, a pivoted follower coöperating therewith and means for moving the cigar-branding device and the follower simultaneously to effect the branding of the cigar.

4. In a cigar-branding machine, the combination of a slotted drum having seats on the outside thereof for the reception of cigars, a pivoted follower, a pivoted cigar-branding device located within said drum and step-by-step mechanism for rotating the drum step by step.

5. In a cigar-branding machine, the combination of a slotted drum having seats on the outside thereof for the reception of cigars, a pivoted cigar-branding apparatus located within the said drum and means for moving the said cigar-branding apparatus and for imparting a step-by-step harmonious rotary movement to the drum, both actuated from a common actuating device, and a hopper located above and in proximity with the drum, substantially as described.

6. In a machine for branding cigars, the combination of a rigid drum provided on the exterior thereof with slotted seats for the reception of the cigars to be marked, an oscillating yoke $b'$, a cigar-marking device located within the drum, a pivoted follower-plate coöperating with the cigar-marking device and a plurality of levers connected to the said yoke and serving to actuate the said cigar-marking device.

7. In a cigar-marking device, the combination of a drum provided on the exterior thereof with slotted seats for the reception of cigars to be marked, a cigar-marking device located within the drum, an oscillating yoke $b'$, cam mechanism for oscillating said yoke, a connection between the oscillating yoke and the cigar-marking device and step-by-step mechanism for revolving the drum step by step.

8. In a cigar-marking device, the combination of a drum open at one end and provided on its exterior with slotted seats for the reception of cigars to be marked, a cigar-marking device, actuating means therefor supported outside of the drum and projecting into the same.

9. In a machine for marking cigars, the combination of a cigar-carrying drum open at one end and provided on the exterior thereof with slotted seats for receiving cigars to be marked, a cigar-marking device with actuating means therefor pivoted outside of the drum and projecting into the said drum through the open end thereof and means for rotating the drum.

HERMAN ROSENBLUM.

Witnesses:
M. TOLK,
MAX SCHADSKY.